(12) United States Patent
Montgomerie et al.

(10) Patent No.: US 8,101,554 B2
(45) Date of Patent: Jan. 24, 2012

(54) WELL TREATMENT COMPRISING A POLYMER FORMED FROM A DIALLYL AMMONIUM SALT AND A SCALE INHIBITOR

(75) Inventors: Harry Montgomerie, Aberdeen (GB); Ping Chen, Aberdeen (GB); Thomas Hagen, Stavanger (NO); Rex Wat, Ranheim (NO); Olav Martin Selle, Jakobsli (NO)

(73) Assignees: Champion Technologies Ltd. (GB); Statoilhydro ASA. (NO)

( * ) Notice: Subject to any disclaimer, the term of this patent is extended or adjusted under 35 U.S.C. 154(b) by 0 days.

(21) Appl. No.: 12/377,331

(22) PCT Filed: Aug. 16, 2007

(86) PCT No.: PCT/GB2007/003131
§ 371 (c)(1),
(2), (4) Date: Jun. 15, 2010

(87) PCT Pub. No.: WO2008/020220
PCT Pub. Date: Feb. 21, 2008

(65) Prior Publication Data
US 2010/0273682 A1 Oct. 28, 2010

(30) Foreign Application Priority Data

Aug. 17, 2006 (GB) .................................. 0616469.3
Dec. 14, 2006 (GB) .................................. 0624964.3

(51) Int. Cl.
*C09K 8/52* (2006.01)
*C09K 8/60* (2006.01)
*E21B 37/06* (2006.01)

(52) U.S. Cl. ....... 507/90; 166/304; 166/305.1; 507/222; 507/240

(58) Field of Classification Search .................... 507/90, 507/222, 240; 166/304, 305.1
See application file for complete search history.

(56) References Cited

U.S. PATENT DOCUMENTS

| | | |
|---|---|---|
| 3,912,693 A | 10/1975 | Shimizu |
| 4,039,459 A | 8/1977 | Fischer |
| 4,133,773 A | 1/1979 | Simmons |
| 4,455,240 A | 6/1984 | Costello |
| 4,460,477 A | 7/1984 | Costello |
| 4,484,631 A | 11/1984 | Sherwood |
| 4,510,059 A | 4/1985 | Amjad |
| 4,681,164 A | 7/1987 | Stacks |
| 4,801,388 A | 1/1989 | Fong |
| 4,947,934 A | 8/1990 | Hen |
| 4,980,077 A | 12/1990 | Morris |
| 5,015,390 A | 5/1991 | Chen |
| 5,038,861 A | 8/1991 | Shuler |
| 5,092,404 A | 3/1992 | Falk |
| 5,152,902 A | 10/1992 | Koskan et al. |
| 5,181,567 A | 1/1993 | Shuler |
| 5,183,112 A | 2/1993 | Paul |
| 5,207,932 A | 5/1993 | Norman |
| 5,213,691 A | 5/1993 | Emmons |
| 5,219,479 A | 6/1993 | Mathiesen |
| 5,604,185 A | 2/1997 | Hen |
| 5,609,862 A | 3/1997 | Chen |
| 5,711,801 A | 1/1998 | Chatterji |
| 5,893,416 A | 4/1999 | Read |
| 5,939,362 A | 8/1999 | Johnson et al. |
| 6,210,476 B1 | 4/2001 | Chatterji |
| 6,225,430 B1 | 5/2001 | Fong |
| 6,555,505 B1 | 4/2003 | King |
| 6,851,433 B1 | 2/2005 | Gross |
| 7,077,219 B1 | 7/2006 | Chatterji |
| 7,134,497 B1 | 11/2006 | Chatterji |
| 2002/0055439 A1 | 5/2002 | Palmer |
| 2002/0125199 A1 | 9/2002 | Sicius et al. |
| 2005/0067164 A1 | 3/2005 | Ke et al. |
| 2005/0250666 A1 | 11/2005 | Gatlin |
| 2006/0054324 A1 | 3/2006 | Sullivan |
| 2008/0248974 A1* | 10/2008 | Chen et al. .................. 507/90 |

FOREIGN PATENT DOCUMENTS

| | | |
|---|---|---|
| CA | 2059182 | 7/1992 |
| EP | 0082567 | 6/1983 |
| EP | 0082657 | 6/1983 |
| EP | 0161763 | 11/1985 |
| EP | 0305611 | 3/1989 |
| EP | 0521666 | 1/1993 |
| EP | 0643081 | 3/1995 |
| EP | 0976911 | 2/2000 |
| GB | 1447911 | 9/1974 |
| GB | 2299331 | 2/1996 |
| GB | 2413811 | 11/2005 |
| GB | 2420572 | 5/2006 |
| WO | 9500479 | 1/1995 |
| WO | 9520617 | 8/1995 |
| WO | 03036021 | 5/2003 |
| WO | 2004011772 | 2/2004 |
| WO | 2005100534 | 10/2005 |
| WO | 2005124097 | 12/2005 |

(Continued)

OTHER PUBLICATIONS

Ping Chen, et al., Field Experiences in the Application of an Inhibitor/Additive Interaction Package to Extend an Inhibitor Squeeze Life, SPE 100466, 2006 SPE International Oilfield Scale Symposium, Society of Petroleum Engineers, Jun. 2006, pp. 1-10.

(Continued)

*Primary Examiner* — Timothy J. Kugel
(74) *Attorney, Agent, or Firm* — Banner & Witcoff, Ltd.

(57) ABSTRACT

The present invention provides a method for increasing the retention of a scale inhibitor within a hydrocarbon producing system (e.g. a subterranean formation), said method comprising contacting said system with a polymer formed from a diallyl ammonium salt and with said scale inhibitor, wherein said polymer formed from a diallyl ammonium salt has a molecular weight of greater than 50,000 (e.g. a molecular weight of 55,000 to 2,000,000).

18 Claims, 4 Drawing Sheets

FOREIGN PATENT DOCUMENTS

| | | |
|---|---|---|
| WO | 2007015090 | 2/2007 |
| WO | 2007080417 | 7/2007 |
| WO | 2008020220 | 2/2008 |

OTHER PUBLICATIONS

I.R.Collins, et al., Extending Squeeze Lifetimes Using Miscible Displacement, SPE 74650, SPE Oilfield Scale Symposium, Society of Petroleum Engineers, Jan. 2002, pp. 1-10.

Oystein Bache et al., Ester Cross-Linking of Polycarboxylic Acid Scale Inhibitors as a Possible Means to Increase Inhibitor Squeeze Lifetime, SPE 60190, 2000 Second International Symposium on Oilfield Scale, Society of Petroleum Engineers, Jan. 2000.

Ping Chen, et al., Enhanced Inhibitor Retention through Surface Precipitation and Molecular Interaction, 16th International Oil Field Chemistry Symposium 13, Mar. 2004, pp. 1-21.

Hall, et al., "The photoinitiated cyclopolymerization of dienes in the creation of novel polymeric systems and three-dimensional networks," 14 J. Mater. Chem. 2593-2602(2004).

Hammerschmidt, et al., "The Phosphonate-Phosphate and Phosphate-Phosphonate Rearrangement and Their Applications V[1]. On the Reaction of Sbutyllithium/TMEDA with Symmetrical Trialkyl Phosphates," 128 Monatshefte Fur Chemie 1173-1180 (1997).

\* cited by examiner

WELL TREATMENT COMPRISING A POLYMER FORMED FROM A DIALLYL AMMONIUM SALT AND A SCALE INHIBITOR

FIELD OF THE INVENTION

This invention relates to a method of controlling scale deposition in a hydrocarbon well, and in particular, to a method of increasing the retention of a scale inhibitor on a rock comprising a subterranean formation.

BACKGROUND OF THE INVENTION

During the operation of a hydrocarbon well (i.e. a gas or oil well) various down-hole problems can arise including the deposition of scale which inhibits the hydrocarbon flow. Scale is a water-related problem which arises as a result of the comingling of incompatible aqueous fluids in the formation (i.e. the rock). For example, where sea water is injected into a subterranean formation to drive oil through the formation into a producer well hole, differences in the nature of the ions present in the injection water and that already present in the formation may cause the precipitation of metal salts. In the North Sea, typical scale problems are related to the production of inorganic salts such as $BaSO_4$, $SrSO_4$, $CaSO_4$ and $CaCO_3$. These salts precipitate as scale which, if left untreated, causes scaling of subsurface and surface production equipment and/or tubing and, eventually, blockage of the well hole. Comingling of incompatible aqueous fluids usually occurs within the near well bore area of a subterranean formation. The severity of the problem is highly dependent on the field operating conditions, which can vary from mild scaling tendencies to the extreme.

To prevent scale from forming in the system, a chemical inhibitor is typically injected continuously and/or by periodic "squeeze" treatments. The scale inhibitor prevents the formation of scale thereby increasing oil or gas flow. In the case of reservoir treatments intended to protect the critical near well bore area, "squeeze" treatments are normally preferred.

In a "squeeze" treatment, a scale inhibitor at concentrations between 5-20% by weight is normally injected into the formation through a producer well hole after a pre-flush. After over-flush and shut-in, well production is then resumed. Ideally the production water then slowly leaches or washes out the retained scale inhibitor from the formation. More specifically the leaching process should place a low, but still effective, concentration (e.g. around 1-100 ppm) of the scale inhibitor in the produced water to prevent scale deposition. Depending on the inhibitor retention and release properties in the formation, however, the effect of this treatment may last from one month to about 24 months. For economic reasons, a prolonged period of protection from scale formation is clearly desirable.

An ideal scale inhibitor return curve for scale inhibitor concentration is one where, after the overflush is complete, the inhibitor desorbs into the produced water at a rate that provides a constant concentration that is the minimum required to prevent scale formation. Even more ideally, this process continues until all of the scale inhibitor squeezed into the formation is released in this way.

Typically, however, squeeze treatments do not provide ideal scale inhibitor return curves. Usually the concentration of scale inhibitor in the produced water is initially high, and much greater than that required to prevent scale formation, as a result of inhibitor failing to adsorb to the formation. Thereafter the concentration of scale inhibitor tends to decrease until it eventually falls below the minimum required to prevent scale deposition. The process is therefore inefficient as a large proportion of the inhibitor introduced in the squeeze treatment is returned almost immediately and does not serve to prevent scale formation. Moreover regular repetition of scale inhibitor treatment is highly undesirable as oil production invariably needs to be stopped to allow the treatment to be carried out.

Various techniques have been used to try to increase the proportion of scale inhibitor that is retained in a well. For example, U.S. Pat. Nos. 5,181,567; and 5,038,861 disclose a method of prolonging the useful life of scale inhibitors in oil wells that employs polyquaternary amines such as poly-(dimethylamine-co-ammonium chloride) or poly-(diallyldimethylammonium chloride). In a typical process, an amine solution is injected into a well, followed by injection of a scale inhibitor and an overflush. The well is then shut in for 20-24 hours before production recommences. To ensure facile injection of the polyquaternary amines into the formation during the process, U.S. Pat. Nos. 5,181,567; and 5,038,861 teaches that their molecular weight should be below 50,000.

A related strategy is disclosed in PCT/GB03/03339. In PCT/GB03/03339, it is disclosed that "bridging agents" that are positively charged polymers may be used to precondition a rock material and thereby enhance retention of a scale inhibitor thereto. Suitable polymers are polyaminoacids such as polyaspartate and polymers formed from diallyldimethylammonium chloride. No details of how the polymers are made or of their resulting properties (e.g. molecular weights) are, however, disclosed.

Without wishing to be bound by theory, it is thought that the use of charged polymers such as those described in the above-mentioned applications enhances retention of scale inhibitors in subterranean formations by a mechanism wherein the adsorption of the positively charged compounds to the formation reduces its negative charge. As a result scale inhibitors, which are often negatively charged, are more readily retained on the formation.

Another mechanism that has been exploited to increase inhibitor retention in oil wells is precipitation with $Ca^{2+}$. $Ca^{2+}$, usually from $CaCl_2$, is thought to react with scale inhibitors forming a complex of $Ca^{2+}$/inhibitor that precipitates in the well. Thus for the inhibitor to return in the produced water, the precipitate must dissolve. Since this depends on the conditions in the well including the inhibitor concentration in the water, this process results in increased retention of the inhibitor in the formation. A problem that is encountered with use of $Ca^{2+}$, however, is formation damage. More specifically it has been found, that $Ca^{2+}$/scale inhibitor precipitates may reduce, and in some cases significantly reduce, the permeability of the formation. Thus use of $Ca^{2+}$ is generally not possible in low permeability formations.

A precipitation mechanism is also used in U.S. Pat. No. 4,947,934 to increase scale inhibitor retention. In the method described in U.S. Pat. No. 4,947,934 a scale inhibitor that is a polyacrylate having a molecular weight of 500 to 10,000 is dissolved in an aqueous solution with a polyvalent cation and applied to a formation. Under the formation conditions, precipitation of a polyvalent cation-polyacrylate complex is thought to occur and thereby increase retention of the polyacrylate inhibitor in the formation. Examples of polyvalent cations that may be used in this method include $Cr^{3+}$, $Ti^{3+}$, $Al^{3+}$, $Fe^{3+}$ and $Zr^{4+}$. A problem encountered with this method, however, is that it introduces cations into the formation that may themselves be able to form scales. Moreover, as with those methods based on Ca²⁺, the precipitates formed may reduce the permeability of the formation (i.e. cause formation damage).

More recently strategies for enhancing inhibitor retention in hydrocarbon wells have focussed on modification of the inhibitor itself, rather than on provision of additional agents. It was reported in 2000, for example, that inhibitor retention in oil wells may be enhanced by ester cross-linking of polycarboxylic scale inhibitors. In this method the molecular weight of polycarboxylic acid scale inhibitors is increased by the crosslinking so that a stronger adsorption to the formation surface may be achieved. Initial results showed that whilst the cross linking slightly reduces the inhibitor efficiency, that retention in the well is increased by up to 100%.

Another report in 2002 suggests that use of microemulsion-based scale inhibitor formulations may increase the retention of the scale inhibitor. It is believed that the use of such emulsions increase treatment lifetime by the miscible displacement of organic material from formation surfaces thereby increasing the surface area available for the scale inhibitor to adsorb onto. This approach has the advantage of simplicity but the microemulsions are relatively expensive compared to other squeeze inhibitor treatments.

Hence there is still a need for alternative methods for increasing retention of scale inhibitors in oil wells, and in particular, for methods that extend the effect of a squeeze treatment. In addition the method should not damage the formation (e.g. significantly reduce permeability) and, due to increased environmental concerns, the chemicals employed should exhibit good biodegradation properties with low toxicity and low bioaccumulation.

It has now been found that certain polymers formed from a diallyl ammonium salt are especially suitable for use in a method of increasing the retention of scale inhibitors in a subterranean formation, particularly when applied as a squeeze treatment.

Thus viewed from one aspect the invention provides a method for increasing the retention of a scale inhibitor within a hydrocarbon producing system (e.g. a subterranean formation), said method comprising contacting said system with a polymer formed from a diallyl ammonium salt and with said scale inhibitor, wherein said polymer formed from a diallyl ammonium salt has a molecular weight of greater than 50,000 (e.g. a molecular weight of 55,000 to 2,000,000).

In a preferred embodiment of the method of the present invention, said method comprises squeeze treating said system with said polymer and said scale inhibitor as hereinbefore defined.

Viewed from another aspect the invention provides the use of a polymer formed from a diallyl ammonium salt as hereinbefore defined to increase the retention of a scale inhibitor in a hydrocarbon producing system (e.g. a subterranean formation).

Viewed from a further aspect the invention provides the use of a polymer formed from a diallyl ammonium salt as hereinbefore defined in the manufacture of a treatment composition comprising said diallyl ammonium salt and optionally a scale inhibitor for increasing the retention of a scale inhibitor in a hydrocarbon producing system (e.g. a subterranean formation).

Viewed from a still further aspect the invention provides a hydrocarbon well treatment composition comprising a carrier liquid, a polymer formed from a diallyl ammonium salt as hereinbefore defined and optionally a scale inhibitor.

Viewed from yet another aspect the invention provides a kit for increasing the retention of a scale inhibitor within a hydrocarbon producing system (e.g. a subterranean formation), said kit comprising a polymer formed from a diallyl ammonium salt as hereinbefore defined and separately a scale inhibitor.

As used herein the term "scale" is intended to encompass any precipitate which may be foiined within a hydrocarbon (i.e. oil or gas) producing system. In hydrocarbon producing systems, typical examples of scale include sulphate and carbonate salts of group I and group II metals, e.g. $BaSO_4$, $SrSO_4$, $CaSO_4$ and $CaCO_3$.

The term "hydrocarbon producing system" is used herein to encompass the subterranean formation (e.g. rock) from which hydrocarbon is extracted as well as the equipment used in the extraction process. The formation may be an oil or gas well, although the method is particularly suitable for treatment of oil wells. The equipment includes both subsurface and surface equipment (e.g. tubes, pipes, pumps, valves, nozzles, storage containers, screens, etc). In a preferred aspect of the present invention the scaling of hydrocarbon extraction equipment is inhibited or prevented for an increased period of time compared to treatment with the scale inhibitor alone.

The term "squeeze treatment" is used herein to denote a treatment wherein a treatment agent is introduced into the formation and shut-in for at least 1 hour prior to putting the well back onto production. In a preferred squeeze treatment, an overflush is applied after introduction of the treatment agent to push the agent into the formation.

The term "molecular weight" is used herein in relation to polymers to refer to their number average molecular weight as determined by, for example, gel permeation chromatography.

The phrase "polymer formed from diallyl ammonium salt" is used herein to denote polymers consisting essentially of monomers that are diallyl ammonium salts. Typical polymers for use in the invention will comprise at least 90%, preferably at least 95%, still more preferably at least 99% by weight of monomers that are diallyl ammonium salts.

Diallyl ammonium salts suitable for use in the present invention include compounds of formula (I):

(wherein
$R^1$ and $R^2$ are each independently hydrogen or optionally substituted organic radicals having from 1 to 20 carbon atoms, preferably 1 to 12 carbon atoms, e.g. 1 to 6 carbon atoms;
each R is independently selected from hydrogen and organic radicals having from 1 to 20 carbon atoms, e.g. 1 to 6 carbon atoms; and
X is a counterion which may optionally be covalently bonded to either $R^1$ or $R^2$).

Preferred monomers of formula (I) are those wherein each R is a hydrogen atom or a substituted or unsubstituted, preferably unsubstituted, alkyl, alkenyl or aryl group. Particularly preferably, each R is a hydrogen atom or an alkyl group (e.g. methyl or ethyl). Although each R may be different, in preferred monomers of formula (I) each R is the same. Still more preferably, each R is a hydrogen atom.

In formula (I), X is preferably sulfate, phosphate or a halide, especially chloride.

In particularly preferred monomers of formula (I), X is not covalently bonded to either $R^1$ or $R^2$ (i.e. it stands as a separate or free counterion). In these monomers, $R^1$ and $R^2$ are each independently a substituted or unsubstituted, preferably unsubstituted, alkyl, alkenyl or aryl group. Particularly preferably, $R^1$ and $R^2$ are each independently an alkyl group, especially an unsubstituted alkyl group. Preferred alkyl groups have from 1 to 8 carbon atoms, e.g. $C_{1-6}$. Representative examples of preferred alkyl groups include methyl, ethyl, propyl, butyl and pentyl. Methyl is particularly preferred. Although $R^1$ and $R^2$ may be different, in preferred monomers of formula (I), $R^1$ and $R^2$ are the same (e.g. $R^1$ and $R^2$ are both methyl).

In formula (I), X may be covalently linked either to $R^1$ or $R^2$. The structure of a monomer of this type in which X is linked to $R^2$ is shown below in formula (Ia):

(wherein
R, $R^1$, $R^2$ and X are as hereinbefore defined).

In those monomers where X is covalently bonded to $R^1$ or $R^2$ (e.g. in monomers of formula (Ia)), the $R^1/R^2$ group to which it is bound is preferably an unsubstituted, alkyl, alkenyl or aryl group. Particularly preferably, the $R^1/R^2$ group to which X is bound is an alkyl group (e.g. a $C_{1-8}$ alkyl group, more preferably a $C_{1-4}$ alkyl group). Ethyl (—$CH_2CH_2$—) is particularly preferred. The remaining $R^1/R^2$ group (i.e. $R^2$ when X is bound to $R^1$ and vice versa) is preferably as defined above for $R^1$ and $R^2$ when X is not covalently bound to the monomer structure.

Polymers for use in the invention may comprise one or more (e.g. 2 or 3, preferably 2) different monomers of formula (I). Preferably, however, the polymers consist of one monomer of formula (I) (i.e. preferred polymers are homopolymers).

Particularly preferred polymers for use in the invention are formed from diallyldimethyl ammonium chloride (DADMAC). DADMAC is commercially available from Chengdu Cation Chemistry Company, China. A homopolymer of DADMAC is still further preferred.

Polymers for use in the invention have a molecular weight of greater than 50,000, more preferably a molecular weight of 55,000-2,000,000, still more preferably a molecular weight of 100,000-1,500,000, yet more preferably a molecular weight of 500,000-1,000,000, e.g. a molecular weight of 800,000-900,000. It has been surprisingly found that these polymers provide much greater retention of scale inhibitor in subterranean formations than corresponding polymers having lower molecular weights. A preferred method of the invention thus comprises a first step of identifying a polymer formed from a diallyl ammonium salt as hereinbefore described that can increase scale inhibitor retention.

Without wishing to be bound by theory, it is thought that this may be due to the higher molecular weight polymers facilitating formation of a gel or precipitate with the scale inhibitor in the formation which increases the inhibitors retention time. Thus preferred polymer and scale inhibitors for use in the method of the invention are those which form a solid (e.g. gel) in the hydrocarbon producing system.

The polymers for use in the invention may be prepared by any conventional polymerisation procedure known in the art (e.g. bulk polymerisation, solution polymerisation or suspension polymerisation). Solution polymerisation is preferred. Those skilled in the art will be aware of suitable reaction conditions as well as appropriate catalysts, polymerisation initiators and chain transfer agents. Preferred polymers for use in the invention include those obtainable by polymerisation (e.g. by solution polymerisation) of at least one monomer of formula (I).

Preferred polymers for use in the invention comprise repeating units represented by formula (II) and/or formula (III):

(wherein
R, $R^1$, $R^2$ and X are as hereinbefore defined; and
m is an integer from 400 to 8000, preferably 800 to 4000, more preferably 1500 to 2500).

The polymerisation reaction may involve an intramolecular-intermolecular mechanism sometimes called cyclopolymerisation. In this mechanism a 5- or 6-membered ring may be formed from the monomer of formula (I) in the polymerisaton reaction (by an intramolecular reaction). The ring then reacts with a further monomer in an intermolecular reaction to extend the length of the polymer chain. Further intramolecular and intermolecular reactions may then occur.

During the intramolecular reaction step of the polymerisation, the new bond may be formed between the terminal carbon atom of one allyl group (i.e. at =N—$CR_2$—CR= $CR_2$) and the central carbon atom of the second allyl group (i.e. at =N—$CR_2$—CR=$CR_2$). This reaction yields a 6-membered ring (i.e. forms a repeat unit of formula (III)). Alternatively, the new bond may be formed between the central carbons atom of both allyl groups. This reaction yields a 5-membered ring (i.e. forms a repeat unit of formula (II)).

The polymers for use in the invention may comprise any ratio of repeat units of formulae (II) and (III). For instance, the ratio of (II):(III) may be in the range 99:1 to 1:99. More preferably the ratio of (II):(III) is in the range 98:2 to 50:50, e.g. at least 95:5. Still more preferably the polymer for use in the invention is substantially free from repeat units of formula (III) (e.g. the polymer comprises less than 2% wt repeating units of formula (III)). Polymers which consist essentially of the repeat units shown in formula (II) are particularly preferred.

Preferably the polymers for use in the present invention are substantially linear. For example, it is preferred that less than 10%, more preferably less than 5% cross linking is present. Still more preferably the polymers for use in the present invention are water-soluble.

Preferred polymers for use in the invention are also those with one or more inorganic end groups. By an "end group" is meant a non-monomeric group which is located at an end of the polymer chain and is covalently attached to the monomer adjacent thereto. Representative examples of preferred inorganic end groups include —$SO_4H$, —$SO_3H$, —$H_2PO_3$, —$H_2PO_4$ and salts thereof. Further preferred end groups include anionic derivatives of the afore-mentioned groups (e.g. —$SO_4^-$, —$SO_3^-$—$HPO_3^-$ and —$HPO_4^-$). Such end groups may be provided by use of appropriate chain transfer agents and/or initiators during polymerisation. Polymers for use in the invention may have one or more (e.g. 1 or 2) end groups.

Polymerisation to produce polymers for use in the invention is preferably carried out in solution. Still more preferably the polymerisation is carried out in water. The pH of the polymerisation medium is preferably 4 to 7, still more preferably 5 to 6.5. If necessary the pH of the medium can be adjusted by addition of a neutralising solution (e.g. NaOH (aq.)).

An initiator will typically be used to start polymerisation. Any water soluble initiator can be employed for this purpose, e.g. hydrogen peroxide, dialkyl peroxides, persulfates and azo compounds. Sodium persulfate is a preferred initiator. Initiators are generally used in an amount of 0.1-10% wt of the total weight of monomers, more preferably 0.5-5% wt of the total weight of monomers, e.g. about 1-2% wt of the total weight of monomers.

In a preferred polymerisation method, a chain transfer agent is also used. Any conventional chain transfer agent may be utilised although hypophosphorus acid and salts thereof are preferred. Hypophosphorus acid and salts thereof may advantageously provide polymers having end groups as hereinbefore defined. Chain transfer agents are typically used in an amount of 1-20% wt of the total weight of monomers, more preferably 2-10% wt of the total weight of monomers.

The polymerisation reaction will typically be carried out at a temperature of 60 to 120° C., preferably 80 to 110° C., e.g. about 100° C. Generally polymerisation occurs for 1 to 4 hours, e.g. about 2 to 3 hours.

Thus, in a typical polymerisation method, monomers (e.g. DADMAC) are dissolved in water and heated to 60-100° C. Initiator and chain transfer agent, both dissolved in water, are added and the temperature is increased until reflux occurs. Generally polymerisation will occur for about 2 hours. The polymer may then be isolated by conventional techniques.

The method of the invention may employ any conventional scale inhibitor. As used herein, the term "scale inhibitor" means any substance that inhibits or prevents the deposition of scale within a hydrocarbon producing system. Scale inhibitors are well known to those skilled in the art and include, for example, phosphonates, phosphate esters and polymers comprising phosphonate, sulfate and carboxylate groups. Representative examples of specific scale inhibitors that may be used in the method of the present invention include hexamethylene diamine tetrakis (methylene phosphonic acid), diethylene triamine tetra (methylene phosphonic acid), diethylene triamine penta (methylene phosphonic acid), polyacrylic acid (PAA), phosphino carboxylic acid (PPCA), diglycol amine phosphonate (DGA phosphonate), 1-hydroxyethylidene 1,1-diphosphonate (HEDP phosphonate), bisaminoethylether phosphonate (BAEE phosphonate) and 2-acrylamido-2-methyl-1-propanesulphonic acid (AMPS).

Preferably the scale inhibitor for use in the method of the invention comprises at least one anionic group, e.g. a carboxylate group. By a carboxylate group is meant a group —$COO^-Z^+$ wherein Z is a counterion, preferably hydrogen or a metal atom (e.g. a group I or II metal atom).

Particularly preferred scale inhibitors for use in the invention are polymeric. Polymeric scale inhibitors may be made by any conventional polymerisation method or may be commercially available, e.g. from Champion Technologies Ltd. Still more preferably the scale inhibitors for use in the invention are polymeric and comprise at least one anionic group.

The scale inhibitor is preferably a polymer formed from an anionic monomer. By an "anionic monomer" is meant a monomer carrying a group capable of providing a negative charge on the resulting polymer chain. Preferred anionic monomers carry at least one carboxylate group.

Polymeric scale inhibitors for use in the present invention are preferably formed from monomers of formula (IV):

(IVa)

(IVb)

(wherein
$R^3$ is —$CO_2Z$, —$SO_3Z$, —$PO_3Z_2$ or an alkyl or aryl group (e.g. a $C_{1-10}$ alkyl or aryl group) substituted with at least one (e.g. one) —$CO_2Z$, —$SO_3Z$ or —$PO_3Z_2$ group in which Z is a hydrogen atom or a univalent metal atom;
$R^4$, $R^5$ and $R^6$ are each independently hydrogen, an optionally substituted alkyl or aryl group having from 1 to 6 carbon atoms or a group $R^3$ as hereinbefore defined.

In preferred monomers of formula (IV), $R^3$ is —$CO_2Z$, an alkyl group (e.g. $C_{1-3}$ alkyl) substituted with at least one (e.g. one) —$CO_2Z$ group or an aryl group (e.g. a phenyl group) substituted with at least one (e.g. one) —$CO_2Z$ group. In particularly preferred monomers $R^3$ is —$CO_2Z$. In further preferred monomers of formula (IV) the group Z is hydrogen or a group I or II metal atom (e.g. sodium or potassium).

Preferred monomers of formula (IV) are also those wherein $R^4$ is a hydrogen atom or a substituted or unsubstituted, preferably unsubstituted, alkyl group. Particularly preferably $R^4$ is hydrogen or a $C_{1-3}$ alkyl group (e.g. methyl). Still more preferably $R^4$ is hydrogen.

In further preferred monomers of formula (IV), $R^5$ and $R^6$ are independently hydrogen, —$CO_2Z$, an alkyl group (e.g. $C_{1-3}$ alkyl) substituted with at least one (e.g. one) —$CO_2Z$ group or an aryl group (e.g. a phenyl group) substituted with a —$CO_2Z$ group wherein Z is as hereinbefore defined. Although $R^5$ and $R^6$ may be different, in preferred monomers of formula (II), $R^5$ and $R^6$ will be the same. Still more preferably $R^5$ and $R^6$ are both hydrogen atoms.

Preferred monomers are those of formula (IVa).

Particularly preferred scale inhibitors for use in the present invention are polymers comprising an anionic monomer selected from acrylic acid, methacrylic acid, vinyl sulfonic acid, vinyl phosphonic acid, maleic anhydride, itaconic acid, crotonic acid, maleic acid, fumaric acid or styrene sulfonic acid. Especially preferred scale inhibitors are formed from anionic monomers selected from acrylic acid, methacrylic acid, maleic anhydride, itaconic acid, crotonic acid and maleic acid, especially acrylic acid. Such monomers are commercially available, e.g. from Aldrich Chemical Company Inc.

Especially preferred scale inhibitors for use in the present invention comprise a copolymer formed from a diallyl ammonium salt (e.g. dially dimethyl ammonium chloride) and at least one anionic monomer as hereinbefore described. Representative examples of scale inhibitors of this type are disclosed in WO2007/01509 to Champion Technologies Ltd and WO2007/08041 to Champion Technologies Ltd and Sichuan Sanyuan Chem Limited, Corporation.

Representative examples of commercially available scale inhibitors that are suitable for use in the method of the invention include Gyptron SA1820, Gyptron SA1400, Gyptron SA1470, Gyptron SA1110, Gyptron SA1460 and Gyptron SA1910 (all available from Champion Technologies Ltd).

Whilst not wishing to be bound by theory, it is believed that the use of a polymer formed from a diallyl ammonium salt having a molecular weight of greater than 50,000 (e.g. a molecular weight of 50,000 to 2,000,000) in conjunction with a scale inhibitor, especially a scale inhibitor comprising at least one carboxylate group, increases retention of the scale inhibitor in a hydrocarbon formation by a novel mechanism. This mechanism may involve a combination of effects, including modification of the formation surface to enhance adsorption thereto and precipitation. It is believed that when polymers formed from a diallyl ammonium salt as hereinbefore defined are combined with scale inhibitors, and in particular scale inhibitors comprising a carboxylate group, a solid (e.g. gel) forms. This gel acts like a precipitate in that it is easily retained in a hydrocarbon well. However, the reaction to form the solid (e.g. gel) is believed to be reversible. Thus if the pH, temperature, scale inhibitor concentration and the like change, the solid will dissolve and the scale inhibitor will be freed to return to the surface. The reversible formation of a solid (e.g. gel) from the polymer formed from diallyl ammonium salts and a scale inhibitor may therefore provide the key to enhancing inhibitor retention. Such gels have only been found to be formed from high molecular weight polymers of diallyl ammonium salts as hereinbefore defined.

The method of the invention is therefore different from those prior art techniques employing relatively low molecular weight poly(quaternaryamine) salts as these earlier methods rely solely on adsorption of the amine to the rock to improve retention of scale inhibitor thereto. It is also different from the prior art technique of employing $Ca^{2+}$ since the polymer formed from a diallyl ammonium salt can itself be adsorbed onto a rock surface, preferably in a preconditioning step. Thus a further advantage of the method of the invention is that the polymer formed from a diallyl ammonium salt can be pre-injected followed by an injection of a scale inhibitor. This reduces or prevents formation damage (e.g. loss in permeability).

The polymer formed from a diallyl ammonium salt for use in the invention is preferably applied as a solution or dispersion (e.g. a solution) in a liquid carrier. The liquid carrier may be aqueous or non-aqueous. Suitable non-aqueous carriers include alkanols, particularly polyols (e.g. a glycol). Particularly preferred glycols include those of the formula $(CH_2)_n(OH)_2$ wherein n is 2 to 6 (e.g. ethylene glycol). Still more preferably the liquid carrier is aqueous (e.g. sea water).

When the liquid carrier is aqueous, it is preferred that the solution or dispersion of polymer fanned from a diallyl ammonium salt in carrier liquid has a pH less than 7. Preferably the pH of copolymer solution/dispersion is 1 to 7, more preferably 3 to 6, e.g. about 4 to 6. Particularly preferably the pH of the copolymer solution/dispersion is about 1 to 5, e.g. 2 to 4 or about 3.

The concentration of the polymer formed from a diallyl ammonium salt in the carrier liquid will be an amount effective to increase scale inhibitor retention and will be readily determined by those skilled in the art. Typically, however, the polymer will be present in the liquid carrier at a concentration of 0.01 to 30% wt, preferably 1 to 10% wt, more preferably 5 to 10% wt, e.g. about 5 to 7% wt.

The scale inhibitors for use in the invention are also preferably applied as a solution or dispersion (e.g. a solution) in a liquid carrier. The liquid carrier may be aqueous or non-aqueous. Suitable non-aqueous carriers include alkanols, particularly polyols (e.g. a glycol). Particularly preferred glycols include those of the formula $(CH_2)_n(OH)_2$ wherein n is 2 to 6 (e.g. ethylene glycol). Still more preferably the liquid carrier is aqueous (e.g. sea water).

When the liquid carrier is aqueous, it is preferred that the solution or dispersion of scale inhibitor in carrier liquid has a pH less than 7. Preferably the pH of scale inhibitor solution/dispersion is 1 to 6, more preferably 1 to 3, e.g. about 2 to 3. Low pHs (e.g. pH 1 to 3) are preferred as this has been found to promote the reaction between the polymer formed from diallyl ammonium salts and the scale inhibitor, especially those containing a carboxylate group, to form a solid (e.g. gel). As mentioned above, the formation of this solid (e.g. gel) significantly increases the retention time of the scale inhibitor in the formation as it is must first dissolve back into the formation waters to return to the surface. Dissolution of the scale inhibitor into the foimation waters may occur due to a natural change in conditions and/or may be induced by introduction of a high pH solution (e.g. pH>5) into the well.

The concentration of the scale inhibitor in the carrier liquid will be an amount effective to inhibit scale formation and will be readily determined by those skilled in the art. Typically, however, the scale inhibitor will be present in the liquid carrier at a concentration of 0.05 to 50% wt, preferably 0.1 to 30% wt, more preferably 1 to 20% wt, e.g. about 5 to 10% wt.

The polymer formed from a diallyl ammonium salt and the scale inhibitor are preferably formulated in separate liquid carriers. In this case, the polymer formed from a diallyl ammonium salt may be injected before, during or after injection of the scale inhibitor. Preferably, however, the hydrocarbon producing system is contacted with said polymer formed from a diallyl ammonium salt in a first step and with said scale inhibitor in a second step. In this case, the polymer formed from a diallyl ammonium salt may be shut in for a period of time to increase its adsorption to the formation prior to introduction of the scale inhibitor. Typical shut in times are 1 to 24 hours, more preferably 2 to 12 hours, e.g. about 4 hours.

Alternatively the polymer formed from a diallyl ammonium salt and the scale inhibitor may be present together in a liquid carrier. In this case, the compounds are injected simultaneously. Thus in an alternative method of the invention, the hydrocarbon system in contacted with said polymer formed from a diallyl ammonium salt and said scale inhibitor in a single step. This method has the advantage that it is simple and less time consuming.

The carrier liquids may provide an inhibitor concentration in the fluids present in a hydrocarbon formation that is the minimum required to prevent inorganic scale formation (e.g. at least 1 ppm (by volume), more preferably at least 5 ppm (by volume) or 20 ppm (by volume)). Representative examples of inhibitor concentrations in the fluids of a formation are 1 to 10,000 ppm (by volume), more preferably 10 to 5000 ppm (by volume), still more preferably 20 to 1000 ppm (by volume, e.g. about 50 ppm (by volume). More preferably the carrier liquid provides an inhibitor concentration in the fluids of a formation of 1 to 50 ppm (by volume), still more preferably 1 to 10 ppm (by volume), e.g. about 5 ppm (by volume).

The liquid carriers may also contain other additives known in the art for use in well treatment. Such additives include surfactants, thickeners, diversion agents, corrosion inhibitors, pH buffers and catalysts. Preferably the liquid carriers consist essentially of a polymer as hereinbefore defined and a scale inhibitor.

A particularly preferred hydrocarbon well treatment composition comprises a carrier liquid, a homopolymer formed from a diallyl ammonium salt having a molecular weight of greater than 50,000 (e.g. a molecular weight of 55,000 to 2,000,000) and a scale inhibitor, wherein the concentration of said polymer is 1 to 10 wt %. This composition forms a further aspect of the invention.

The amount of treatment composition(s) to be used to inhibit scale formation will vary widely depending on factors such as the nature of the polymer formed from diallyl ammonium salts used, the nature of the scale inhibitor, the nature of the formation (e.g. the levels of Ba, Sr and Ca present) and so on. The appropriate amount of polymer formed from diallyl ammonium salts will be readily determined by those skilled in the art. Typically, however, a polymer may be employed with a 5% treatment solution in an amount in the range of from 0.01 to 5 tons per $m^3$ of formation to be treated, more preferably from 0.01 to 0.03 tons per $m^3$. Similarly the appropriate amount of scale inhibitor will be readily determined by those skilled in the art. Typically, however, a scale inhibitor may be employed with a 10% treatment solution in an amount in the range of from 0.01 to 5 tons per $m^3$ of formation to be treated, more preferably from 0.02 to 0.01 tons per $m^3$ The treatment method of the present invention may be applied to a hydrocarbon producing system at any stage, e.g. before and/or after hydrocarbon production. Treatment according to the invention may also be repeated as many times as necessary.

Treatment according to the method of the present invention may be conducted according to any techniques conventional in the art and any convenient equipment may be used to supply the treatment composition to the hydrocarbon producing system. For instance, bull heading or coil tubing may be used. Thus the treatment composition may be introduced into a well bore by, for example, injection under pressures sufficient to penetrate the formation and the equipment present therein. A preferred method for introducing the copolymers hereinbefore described into a hydrocarbon producing system is a "squeeze" treatment.

Although the method of the invention may be carried out on a hydrocarbon producing system (e.g. a subterranean formation) without any pre-flush, it is preferred to treat the formation with a pre-flush composition prior to treatment with the polymer described herein. The purpose of the pre-flush may be, for example, to wet the surface of the formation (e.g. if the formation is oil-rich) to aid retention of the polymer described herein. The pre-flush composition may therefore include a surfactant.

An after-flush or over-flush composition may also be optionally used in the method of the invention. An after-flush is typically done following addition of the polymer and scale inhibitor described herein. It serves to displace any polymer/scale inhibitor which has not absorbed onto the surface of the formation out of the well bore. Any convenient aqueous or non-aqueous, preferably aqueous, liquid may be used.

Treatment times will depend on a number of factors including the nature of the polymer used, the nature of the formation and the level of scaling which would otherwise occur. Suitable times will be readily determined by those skilled in the art.

The invention will now be further described by way of the following non-limiting Examples and Figures wherein.

EXAMPLES

The Examples were performed using the following materials unless otherwise stated:

Brine: 6% of NaCl brine and formation brine. The chemistry of the formation brine is shown in Table 1 below:

TABLE 1

| Composition of Brines | |
| --- | --- |
| Composition (mg/l) | Formation Brine |
| $Na^+$ | 8500 |
| $K^+$ | 200 |
| $Ca^{2+}$ | 400 |
| $Mg^{2+}$ | 70 |
| $Ba^{2+}$ | 60 |
| $Sr^{2+}$ | 60 |
| $HCO_3^-$ | 1100 |
| $Cl^-$ | 13500 |

Chemicals: The inhibitor used is Gyptron® SA1820, commercially available from Champion Technologies Ltd. It is a polymer carrying carboxylate groups.

The additive used is a homopolymer of DADMAC having a MW of about 600,000.

Rock Substrate: The core material used was from Munin sand in the Draupne formation.

Tests

Dynamic Loop Tests

The dynamic loop test is designed to evaluate the ability of an inhibitor to delay the nucleation and growth of scale on a pre-scaled metal surface over a period of time. All tests were performed with mixed brines, i.e. 50:50 NaCl brine, formation brine (see Table 1). The test conditions were designed to represent an extreme case of barium sulphate scaling.

Figure 1:
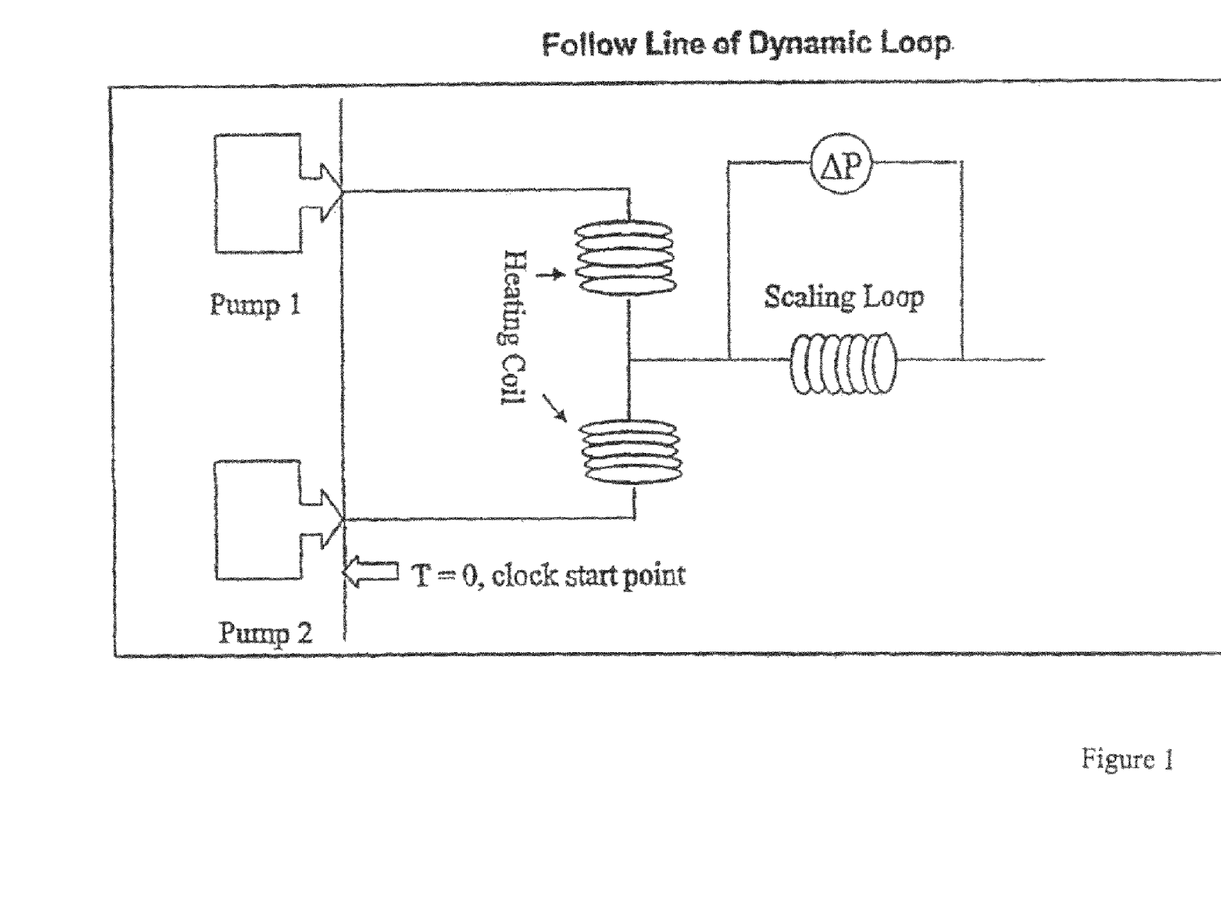
FIG. 1 is a schematic of the equipment used for dynamic loop testing.

A schematic of the equipment used is presented in FIG. 1. The formation of scale within the scale loop was tracked by measuring the differential pressure changes across the loop as a function of time. Scale inhibitors are designed to prevent the adhesion and growth of scale within the scale loop and thus prevent an increase in differential pressure at a particular concentration. The minimum concentration required to prevent an increase in pressure of 1 psi over a 3 hour period is termed the minimum inhibitor concentration (MIC).

The test conditions were set as below:

| Temperature: | 98° C. |
|---|---|
| pH: | 5.5 |
| Flow rate: | 10 ml/min |
| Pre-scale: | yes |

The lowest inhibitor concentration to inhibit scale formation for 3 hours was found to be 10 ppm. The dynamic loop test demonstrates that the inhibitor is an effective scale inhibitor.

Adsorption/Precipitation Beaker Tests

The core material was crushed and sieved to less than 2 mm in size, then dried. It was then transferred into 100 ml jars. The adsorption test was carried out as follows:

1. A solution of additive (10% wt) in NaCl brine was prepared and two solutions of scale inhibitor (10,000 ppm by weight) in NaCl brine were prepared.
2. The pH of the additive solution was adjusted to 3 and the pHs of the inhibitor solutions were adjusted to 3 and 5 respectively
3. Additive solution (32 ml) was added to each jar containing crushed core material and the jars were heated to 85° C.
4. After 5 hours, 25 ml of each of the supernatants were replaced with scale inhibitor solutions.
5. After 24 hours, the contents of the jars were visually analysed and the inhibitor concentration in the supernatants analysed.

The test was also repeated without the step of adding additive solution. In this test, 6% NaCl brine adjusted to pH 3 was added in step 2.

The results are shown in Table 2 below:

TABLE 2

| | Visual Observation | Retention at pH 3 (mg/g) | Retention at pH 5 (mg/g) |
|---|---|---|---|
| 6% NaCl brine | At pH 3 and 5 - clear | 3.93 | 3.85 |
| 10% Additive | At pH 5 - clear At pH 3 - cloudy | 7.61 | 5.04 |

The results show that retention on the rock surface was significantly increased in the presence of the additive, especially at pH 3. The observation of cloudiness in the supernatant of the jar containing additive at pH 3 suggests that precipitation between the additive and the scale inhibitor occurred.

Core Flood Tests

The core flood test was designed to evaluate the inhibitor return profiles and whether any damage may be caused to the formation. The core flood procedure was carried out as follows:

1. Injection of formation brine
2. Overnight crude saturation and heat up to 98° C. (this temperature was maintained throughout the test)
3. Pre-treatment permeability measurement to crude oil (in forward flow, FF and reverse flow, RF)
4. Pre treatment brine saturation
5. Pre treatment brine permeability measurement in FF and RF directions
6. Formation water injection in RF direction
7. Preflush injection (5 pore volumes of 10% additive in NaCl brine) in RF direction
8. Shut in for 5 hours
9. Injection of inhibitor (10 pore volumes of 5% inhibitor in 6% NaCl brine at pH 3) in RF direction
10. Shut in overnight
11. Oil injection and permeability measurement to crude oil in FF and RF directions
12. Formation brine injection at FF direction for 5 days
13. Brine permeability measurement in FF and RF directions
14. Post treatment crude saturation
15. Post treatment crude permeability measurement in FF and RF directions The test was also repeated without the step of adding additive solution. In this test, 5 pore volumes of NaCl brine was added in step 7 and a 10% inhibitor solution in 6% NaCl at pH 3 was used in step 9.

Figure 2:
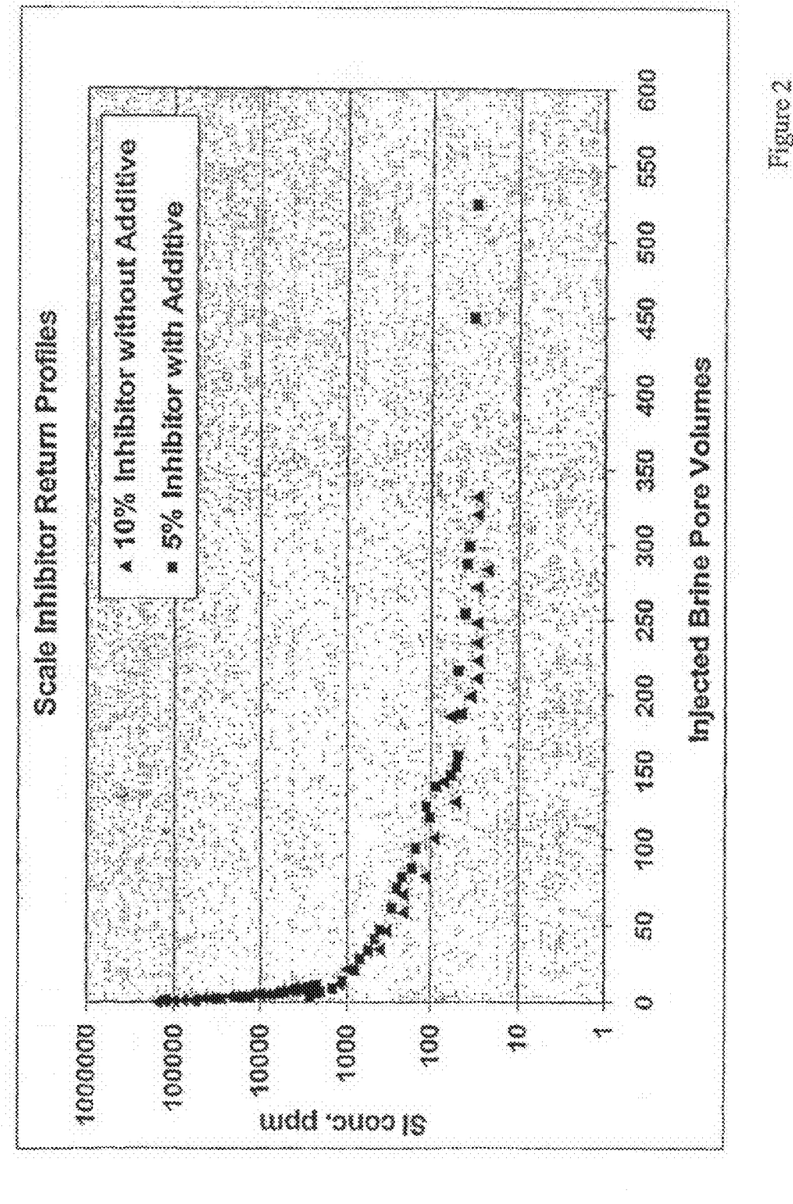
FIG. 2 shows the scale inhibitor return profiles for a treatment according to the method of the invention compared to a treatment wherein a polymer formed a diallyl ammonium salt as hereinbefore defined is not employed.

The results are shown in FIG. 2. As can be seen from FIG. 2, the inhibitor concentration is still over 30 ppm after more than 500 pore volumes of the brine postflush when used in conjuction with additive. FIG. 2 also clearly shows that the core flood pre-treated with additive gives a better retention profile than the core flood that is not treated with additive. Moreover permeability measurements on the core treated with additive and inhibitor showed that 93% oil permeability was retained.

Field Treatment Tests

A drop in the production index and production was observed in a well following seawater breakthrough, indicating that scale deposition occurred in the near well bore area. A scale dissolver treatment was carried out followed by a squeeze treatment according to the method of the invention using the following conditions:

| Preflush: | 10 m$^3$ 2% KCl (to prevent clay swelling) |
|---|---|
| Preflush 2: | 60 m$^3$ 10% Additive in 6% NaCl |
| Main pill: | 220 m$^3$ 5% Inhibitor in seawater |
| Overflush: | 200 m$^3$ (0.1% Inhibitor in seawater) |
| Shut in: | 12 hours |

Figure 3:
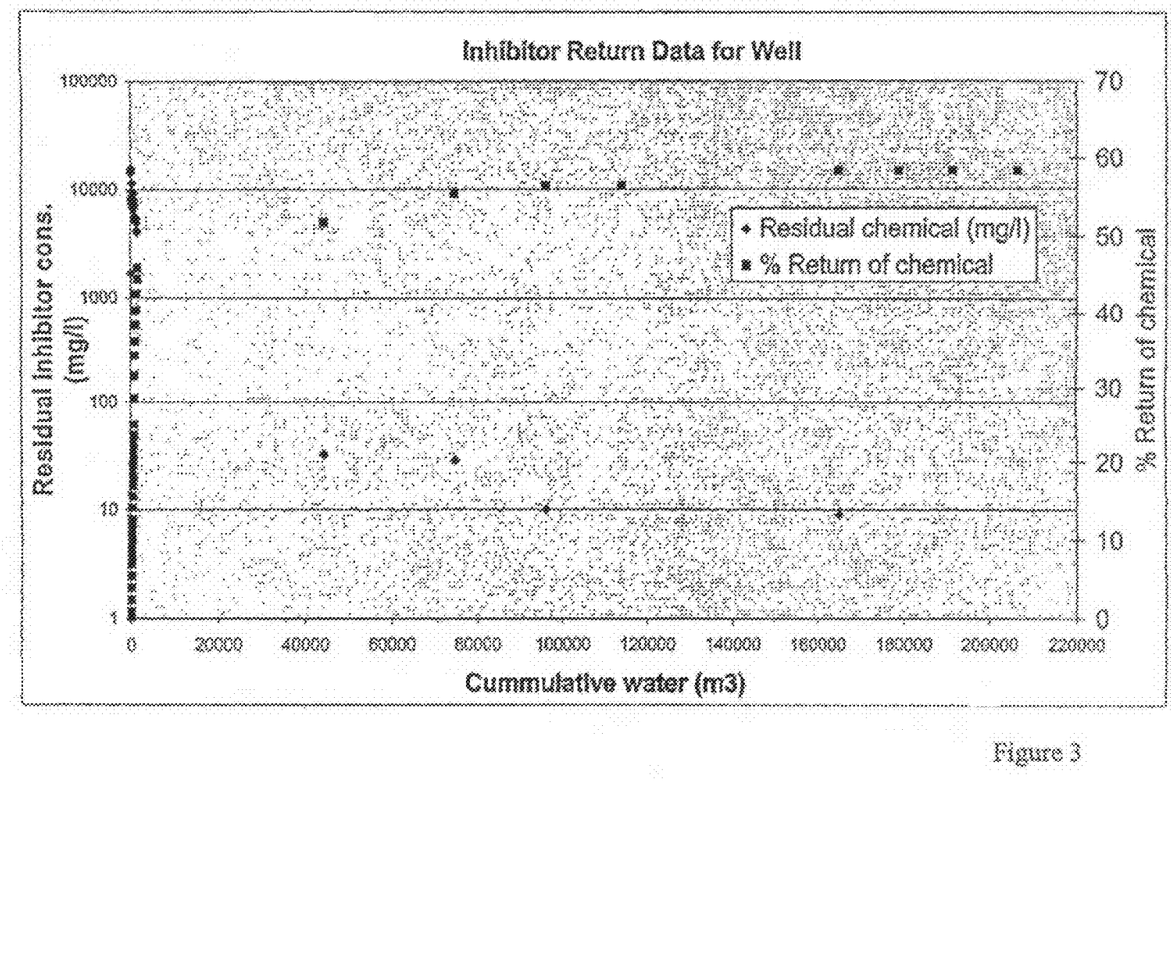
FIG. 3 shows the scale inhibitor return profile for an oil well treated according to the method of the invention.
Figure 4:
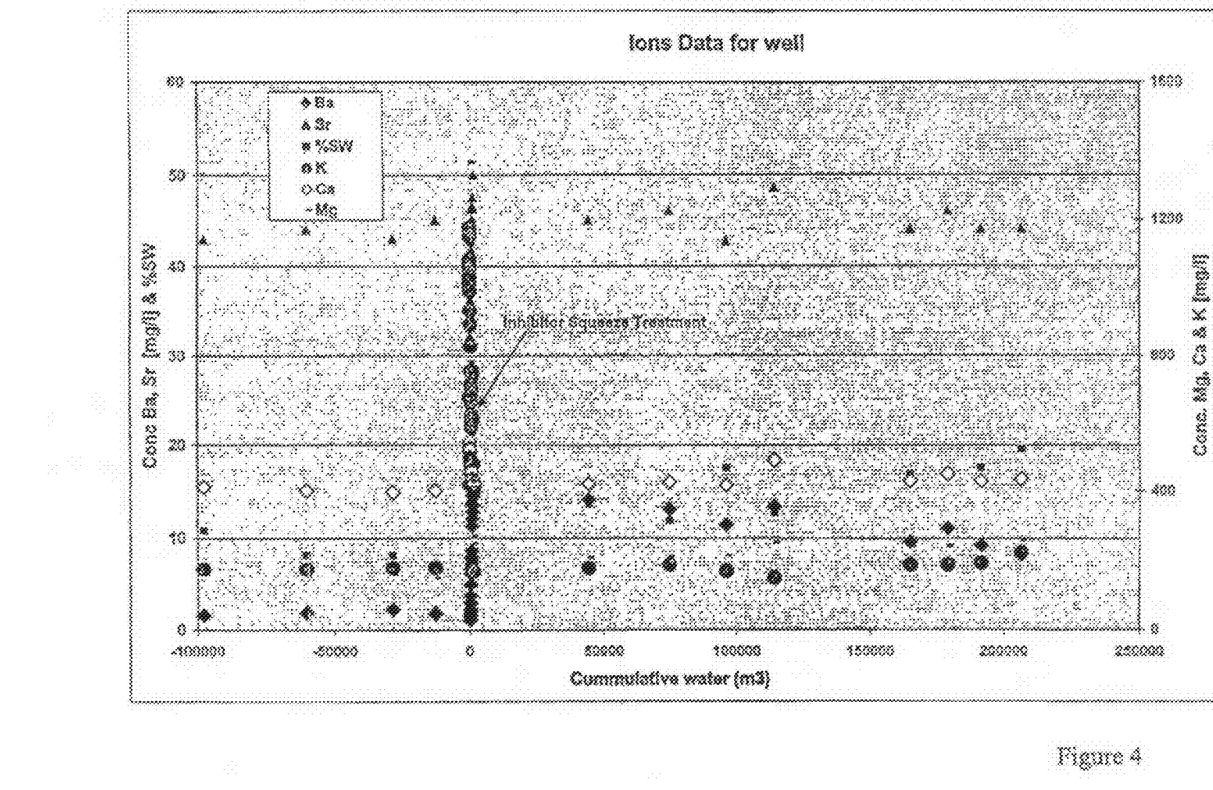
FIG. 4 shows the ion track analysis for the oil well treated according to the method of the invention.

The squeeze treatments were performed by bullheading. The inhibitor return profile and ion data for the treatment are shown in FIGS. 3 and 4 respectively. FIG. 3 shows that the treatment protected approximately 160,000 m$^3$ of produced water without loss of the well productivity. The ion track data in FIG. 4 clearly shows the effect of treatment; before treatment the concentration of barium ion in the production waters had dropped to 2 mg/l (as it was mainly deposited as scale) whereas after treatment it increased to above 10 mg/l. A concentration of 10 mg/l was maintained for at least 6 months.

Effect of Additive Molecular Weight and Scale Inhibitor pH on Inhibitor Retention The additives used were homopolymers of DADMAC having MWs of about 50,000, 500,000 and 1,000,000.

Adsorption Beaker Tests

The core material was crushed and sieved to less than 2 mm in size, then dried. It was then transferred into 100 ml jars. The adsorption tests were carried out as follows:

1. Six solutions (10% wt) of additives in NaCl brine were prepared. The additives had molecular weights of 50,000, 500,000 or 1,000,000 as shown in Table 3 below. Two solutions of scale inhibitor (10,000 ppm by weight) in NaCl brine were also prepared.

2. The pH of the additive solutions was adjusted to 3 and the pH of the inhibitor solutions were adjusted to 3 and 5 respectively.

3. Additive solution (32 ml) was added to each jar containing sand and the jars were heated to 85° C.

4. After 5 hours, 25 ml of each of the supernatants were replaced with scale inhibitor solutions.

5. After 24 hours, the contents of the jars were visually analysed and the inhibitor concentration in the supernatants analysed.

The test was also repeated without the step of adding additive solution. In this test, 6% NaCl brine adjusted to pH 3 was added in step 2.

The results are shown in Table 3 below.

TABLE 3

|  | Retention (mg/g) Inhibitor solution pH at 5 | Retention (mg/g) Inhibitor solution pH at 3 |
| --- | --- | --- |
| 6% NaCl brine | 2.64 |  |
| 10% Additive 1,000,000 MW pH at 3 | 6.60 | 9.77 |
| 10% Additive 500,000 MW, pH at 3 | 7.84 | 8.96 |
| 10% Additive 50,000 MW, pH at 3 | 6.19 | 6.44 |

The results show that scale inhibitor retention on the rock surface was significantly increased in the presence of the additive, especially when the inhibitor was used at pH 3. Table 3 also shows that retention of scale inhibitor generally increases with increasing molecular weight of the additive. This effect is strongest when the pH of scale inhibitor solution was adjusted to 3.

Cloudiness was also observed in the supernatant of the jars containing both additive and inhibitor at pH 3 which suggests that precipitation between the additive and the scale inhibitor occurred.

The invention claimed is:

1. A method for increasing the retention of a scale inhibitor within a hydrocarbon producing system, said method comprising contacting said system with a polymer formed from a diallyl ammonium salt and with said scale inhibitor, wherein said polymer formed from a diallyl ammonium salt has a molecular weight of greater than 50,000.

2. A method as claimed in claim 1, wherein said scale inhibitor is polymeric.

3. A method as claimed in claim 2, wherein said scale inhibitor is formed from monomers of formula (IV):

(IVa)

(IVb)

wherein
R³ is —CO₂Z, —SO₃Z, —PO₃Z₂ or an alkyl or aryl group substituted with at least one —CO₂Z, —SO₃Z or —PO₃Z₂ group in which Z is a hydrogen atom or a univalent metal atom;
R⁴, R⁵ and R⁶ are each independently hydrogen, an optionally substituted alkyl or aryl group having from 1 to 6 carbon atoms or a group R³ as hereinbefore defined.

4. A method as claimed in claim 1, wherein said method comprises squeeze treating said system by introducing said polymer formed from a diallyl ammonium salt and said scale inhibitor into said system and shutting them in a well for at least 1 hour prior to putting the well back into production.

5. A method as claimed in claim 1, wherein said polymer is formed from monomers of formula (I):

(I)

wherein
R¹ and R² are each independently hydrogen or substituted organic radicals having from 1 to 20 carbon atoms,
each R is independently selected from hydrogen and organic radicals having from 1 to 20 carbon atoms; and
X is a counterion which may optionally be covalently bonded to either R¹ or R².

6. A method as claimed in claim 1, wherein said polymer is a homopolymer formed from diallyl dimethyl ammonium chloride.

7. A method as claimed in claim 1, wherein said scale inhibitor comprises at least one anionic group.

8. A method as claimed in claim 1, wherein said polymer is applied as a dispersion or solution in a liquid carrier.

9. A method as claimed in claim 1, wherein said scale inhibitor is applied as a dispersion or solution in a liquid carrier.

10. A method as claimed in claim 1, wherein said polymer and said scale inhibitor form a solid within the hydrocarbon producing system.

11. A method as claimed in claim 1, wherein said polymer is applied as a solution having a pH of 1 to 6.

12. A method as claimed in claim 1, wherein said scale inhibitor is applied as a solution having a pH of 1 to 3.

13. A method as claimed in claim 1, wherein said polymer formed from a diallyl ammonium salt has a molecular weight of between 55,000 to 2,000,000.

14. A method as claimed in claim 1, wherein said scale inhibitor comprises at least one carboxylate group.

15. A hydrocarbon well treatment composition comprising:
a carrier liquid;
a homopolymer formed from a diallyl ammonium salt having a molecular weight of greater than 50,000, wherein the concentration of said homopolymer is 1 to 10 wt%; and
a scale inhibitor.

16. A composition as claimed in claim 15, wherein said polymer formed from a diallyl ammonium salt has a molecular weight of between 55,000 to 2,000,000.

17. A kit for increasing the retention of a scale inhibitor within a hydrocarbon producing system, said kit comprising:
a polymer formed from diallyl ammonium salt having a molecular weight of greater than 50,000; and
separately from the polymer a scale inhibitor.

18. A kit as claimed in claim 17, wherein said polymer formed from a diallyl ammonium salt has a molecular weight of between 55,000 to 2,000,000.

\* \* \* \* \*